(12) United States Patent
Kemeny

(10) Patent No.: US 12,409,678 B2
(45) Date of Patent: Sep. 9, 2025

(54) WHEEL ASSEMBLY INCLUDING ROTATIONALLY OFFSET AXLE ATTACHMENT ASSEMBLIES AND RELATED METHODS

(71) Applicant: GACW Incorporated, Chandler, AZ (US)

(72) Inventor: Zoltan Kemeny, Chandler, AZ (US)

(73) Assignee: GACW INCORPORATED, Chandler, AZ (US)

( * ) Notice: Subject to any disclaimer, the term of this patent is extended or adjusted under 35 U.S.C. 154(b) by 494 days.

(21) Appl. No.: 17/831,208

(22) Filed: Jun. 2, 2022

(65) Prior Publication Data
US 2023/0106152 A1   Apr. 6, 2023

Related U.S. Application Data

(60) Provisional application No. 63/360,495, filed on Oct. 6, 2021.

(51) Int. Cl.
*B60B 9/24* (2006.01)
*B60B 27/06* (2006.01)
*B60C 7/10* (2006.01)

(52) U.S. Cl.
CPC .............. *B60B 9/24* (2013.01); *B60B 27/065* (2013.01); *B60C 7/10* (2013.01); *B60B 2320/10* (2013.01); *B60B 2900/313* (2013.01)

(58) Field of Classification Search
CPC .... B60B 9/06; B60B 9/24; B60B 9/26; B60B 9/28; B60B 27/065; B60C 7/10; B60C 7/146
See application file for complete search history.

(56) References Cited

U.S. PATENT DOCUMENTS

| | | | |
|---|---|---|---|
| 911,975 A | 2/1909 | Gustafson | |
| 1,081,551 A | * 12/1913 | Pearl | B60B 9/20 152/62 |

(Continued)

FOREIGN PATENT DOCUMENTS

| | | |
|---|---|---|
| EP | 1627750 | 2/2006 |
| WO | 2015105548 | 7/2015 |

*Primary Examiner* — S. Joseph Morano
*Assistant Examiner* — Emily G. Castonguay
(74) *Attorney, Agent, or Firm* — ALLEN, DYER, DOPPELT, + GILCHRIST, P.A.

(57) ABSTRACT

A wheel assembly for coupling to an axle may include an outer rim, and distal inboard and outboard attachment points coupled to the outer rim. An inboard axle attachment assembly may include an inboard medial portion to be coupled to the axle and angularly spaced inboard arms extending outwardly from the inboard medial portion and defining proximal inboard attachment points. An outboard axle attachment assembly may be rotationally offset from the inboard axle attachment assembly and include an outboard medial portion to be coupled to the axle and angularly spaced outboard arms extending outwardly from the outboard medial portion and defining proximal outboard attachment points. Inboard gas springs may each be coupled between respective ones of the distal inboard attachment points and the proximal inboard attachment points, and outboard gas springs may each be coupled between respective ones of the distal outboard attachment points and the proximal outboard attachment points.

16 Claims, 13 Drawing Sheets

(56) References Cited

U.S. PATENT DOCUMENTS

| | | | | |
|---|---|---|---|---|
| 1,465,747 | A | * | 8/1923 | Vobach ..................... B60B 9/26 |
| | | | | 152/93 |
| 1,601,518 | A | | 9/1926 | Weston |
| 1,808,886 | A | | 6/1931 | Courtney |
| 1,979,935 | A | | 11/1934 | Henap |
| 3,672,458 | A | * | 6/1972 | Mackerle ................. F03C 1/247 |
| | | | | 180/308 |
| 6,041,838 | A | | 3/2000 | Al-Sabah |
| 6,698,480 | B1 | | 3/2004 | Cornellier |
| 10,173,463 | B2 | | 1/2019 | Barel et al. |
| 2007/0057480 | A1 | * | 3/2007 | Tada ......................... B60B 9/24 |
| | | | | 384/590 |
| 2013/0340902 | A1 | * | 12/2013 | Kemeny .................. B60B 9/26 |
| | | | | 152/1 |
| 2016/0068016 | A1 | * | 3/2016 | Winshtein ................ B60B 9/24 |
| | | | | 301/6.5 |
| 2016/0363184 | A1 | * | 12/2016 | Noguchi ................. F16F 9/062 |
| 2020/0369079 | A1 | | 11/2020 | Kemeny |

* cited by examiner

WHEEL ASSEMBLY INCLUDING ROTATIONALLY OFFSET AXLE ATTACHMENT ASSEMBLIES AND RELATED METHODS

CROSS REFERENCE TO RELATED APPLICATIONS

This application claims the benefit of U.S. provisional application No. 63/360,495 filed Oct. 6, 2021, which is hereby incorporated herein in its entirety by reference.

TECHNICAL FIELD

The present invention relates to the field of wheels, and more particularly, to wheel assemblies for a vehicle and related methods.

BACKGROUND

A typical wheel may include a rim and tire surrounding the rim. The tire transfers a load of a vehicle from the axle through the wheel to the ground. Tires, for example, those found on most vehicles are pneumatic tires. In other words, a typical tire is pneumatically inflated, for example, with air or other gas, such as nitrogen. More particularly, air is injected into the space between the rim and the inside of the tire to inflate it.

During operation, being pneumatically inflated, a tire absorbs the forces as the vehicle travels over the road surface. The tire and associated inflation pressure may be selected to absorb the above-noted forces while reducing any deformation. However, in many instances, excessive forces placed on the tire may cause the tire and/or rim to deform, puncture, or blowout. Typical forces also cause tread wear of the tire, while excessive forces may also cause rapid tread wear that may lead to a shortened lifespan of the tire and decreased structural integrity of the wheel.

To address the shortcomings of pneumatic-based wheels, non-pneumatic wheels have been developed. By non-pneumatic, it is meant that air or other gas is not injected to inflate an interior volume of a tire. One approach to a non-pneumatic wheel uses mechanical springs. For example, U.S. Pat. No. 911,975 to Gustafson discloses a spring wheel. Secondary spokes are arranged in pairs between pairs of main spokes and the members of each of the secondary spokes therefore pass upon opposite sides of a corresponding pair of intersecting braces. Each of the secondary spokes includes a pair of telescoping members that are pivotally connected at its outer end to ears formed on the hub and extends at its opposite end into a corresponding member.

U.S. Pat. No. 1,601,518 to Weston discloses a resilient wheel that includes radial arms. Connection between a hub and rim members may be provided by pivot pins in outer ends of these arms that have links journaled thereon. The links are pivotally articulated with bent levers, which are in turn pivoted on bracket arms that extend inwardly from the part-circular plates, which are mounted on an inner periphery of a tire holding rim.

Another approach includes a disc between a wheel hub and outer rim. For example, U.S. Pat. No. 1,808,886 to Courtney also discloses a disc or sidewall between a wheel hub and a rim. The disc is engaged by studs that project from the wheel hub and extends from an outer flange obliquely to the wheel hub. The disc assists the wheel tire and rim by resisting any tendency to become displayed laterally as a result of stresses occurring while the wheel is turning.

U.S. Pat. No. 1,979,935 to Henap discloses a hydraulic spoke wheel. Each of the hydraulic spokes include telescoping sections in the form of an outer section and an inner section. The outer section has the stud projecting from one end. The inner section extends from the outer section and is equipped at its extended end with the stem.

U.S. Pat. No. 6,041,838 to Al-Sabah discloses a wheel that includes spokes positioned in a spaced apart relation to each other. Each of the spokes has a first end connected to a rim and a second end connected to a plate member tip of a hub plate member in an offset position from the respective radial axis thereof. The offset position of each of the spokes is further defined by each of the spokes being connected to a respective one of the plate member tips at a predetermined angle (e.g., less than 90-degrees) from the radial axis thereof and defining an operative offset spoke axis, which intersects the radial axis of the plate member tips at the predetermined angle.

U.S. Pat. No. 6,698,480 to Cornellier discloses shock absorbing spokes each having a central cylindrical tube. Each tube has an interior cap having an aperture and an exterior cap having an aperture. Each spoke has an interior piston, a rod with an aperture and a pin. The pin pivotably couples one of the spokes to the hub. Each spoke has an exterior piston, a rod with an aperture and a pin. The pin pivotably couples one of the spokes to the rim assembly. The interior pistons and exterior pistons divide the space within each tube into an interior chamber, an exterior chamber, and a central chamber.

Despite advances in pneumatic tire wheels, and non-pneumatic tire wheels, there is still a need for improvements in wheel technology, particularly, for large construction vehicles, or mining vehicles, for example. The expense of wheel replacement, and the downtime experienced during wheel replacement may add significant expenses to the construction or mining projects.

SUMMARY

A wheel assembly for coupling to an axle may include an outer rim, a plurality of distal inboard attachment points coupled to the outer rim, and a plurality of distal outboard attachment points coupled to the outer rim. The wheel assembly may also include an inboard axle attachment assembly that includes an inboard medial portion to be coupled to the axle and a plurality of angularly spaced inboard arms extending outwardly from the inboard medial portion and defining proximal inboard attachment points. The wheel assembly may also include an outboard axle attachment assembly rotationally offset from the inboard axle attachment assembly and that may include an outboard medial portion to be coupled to the axle and a plurality of angularly spaced outboard arms extending outwardly from the outboard medial portion and defining proximal outboard attachment points. The wheel assembly may also include a plurality of inboard gas springs, each coupled between respective ones of the distal inboard attachment points and the proximal inboard attachment points. A plurality of outboard gas springs may each be coupled between respective ones of the distal outboard attachment points and the proximal outboard attachment points.

The rotational offset between the inboard and outboard axle attachment assemblies may permit inboard and outboard access to the plurality of inboard and outboard gas springs at the plurality of the distal inboard and distal outboard attachment points, for example. The axle may have an axle keyway therein, and the inner and outer axle attachment assemblies may each have an axle receiving opening and a keyway coupled thereto to receive a locking spline within the keyways and the axle keyway.

The plurality of angularly spaced outboard arms may be equally spaced around the outboard medial portion. The plurality of angularly spaced inboard arms may also be equally spaced around the inboard medial portion, for example.

The plurality of inboard and outboard gas springs may include a plurality of inboard and outboard gas springs with associated integral hydraulic dampers. Each of the plurality of inboard and outboard gas springs may include a first cylinder body and a second cylinder body slidable therein, a first seal carried by an end of the second cylinder body defining first and second gas chambers within the first cylinder body, a shaft extending within the first cylinder body and into the second cylinder body defining a hydraulic fluid chamber within the second cylinder body, and an enlarged orifice body coupled to the shaft defining a hydraulic damper with the second cylinder body, for example.

Each of the plurality of inboard and outboard gas springs may have an operating stroke defining a mechanical stop, for example. The wheel assembly may also include a tread carried by an exterior of the outer rim. The tread may include a solid non-pneumatic tread, for example.

A method aspect is directed to a method of making wheel assembly for coupling to an axle. The method may include coupling a plurality of distal inboard attachment points to an outer rim and a plurality of distal outboard attachment points coupled to the outer rim, and coupling an inboard axle attachment assembly to the axle, the inboard axle attachment assembly including an inboard medial portion to be coupled to the axle and a plurality of angularly spaced inboard arms extending outwardly from the inboard medial portion and defining proximal inboard attachment points. The method may also include coupling an outboard axle attachment assembly to the axle, the outboard axle attachment assembly being rotationally offset from the inboard axle attachment assembly and including an outboard medial portion to be coupled to the axle and a plurality of angularly spaced outboard arms extending outwardly from the outboard medial portion and defining proximal outboard attachment points. The method may also include coupling each of a plurality of inboard gas springs, between respective ones of the distal inboard attachment points and the proximal inboard attachment points, and coupling each of a plurality of outboard gas springs, between respective ones of the distal outboard attachment points and the proximal outboard attachment points.

DETAILED DESCRIPTION

Figure 1:
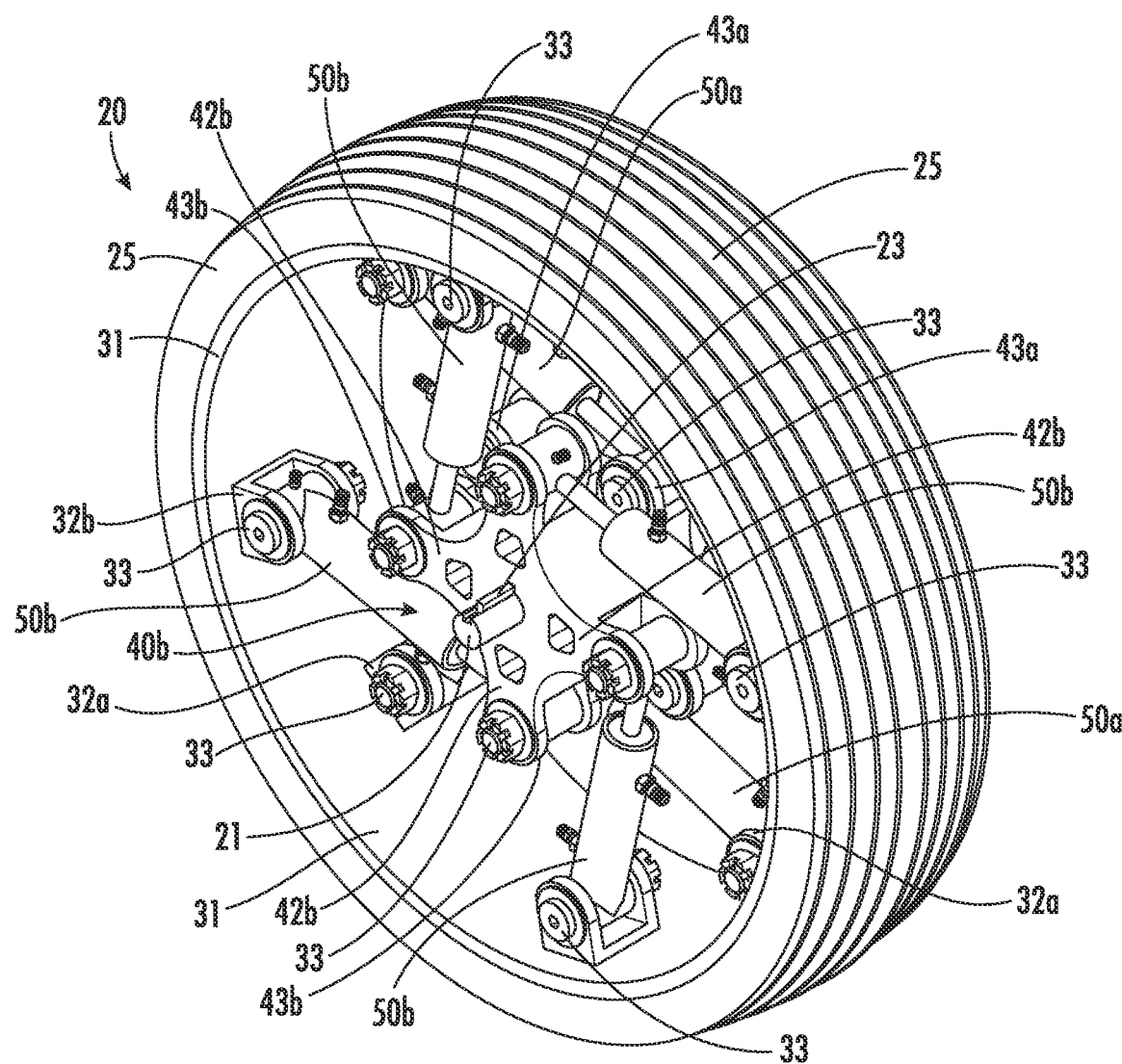
FIG. 1 is a schematic perspective view of a wheel assembly according to an embodiment.
Figure 2:
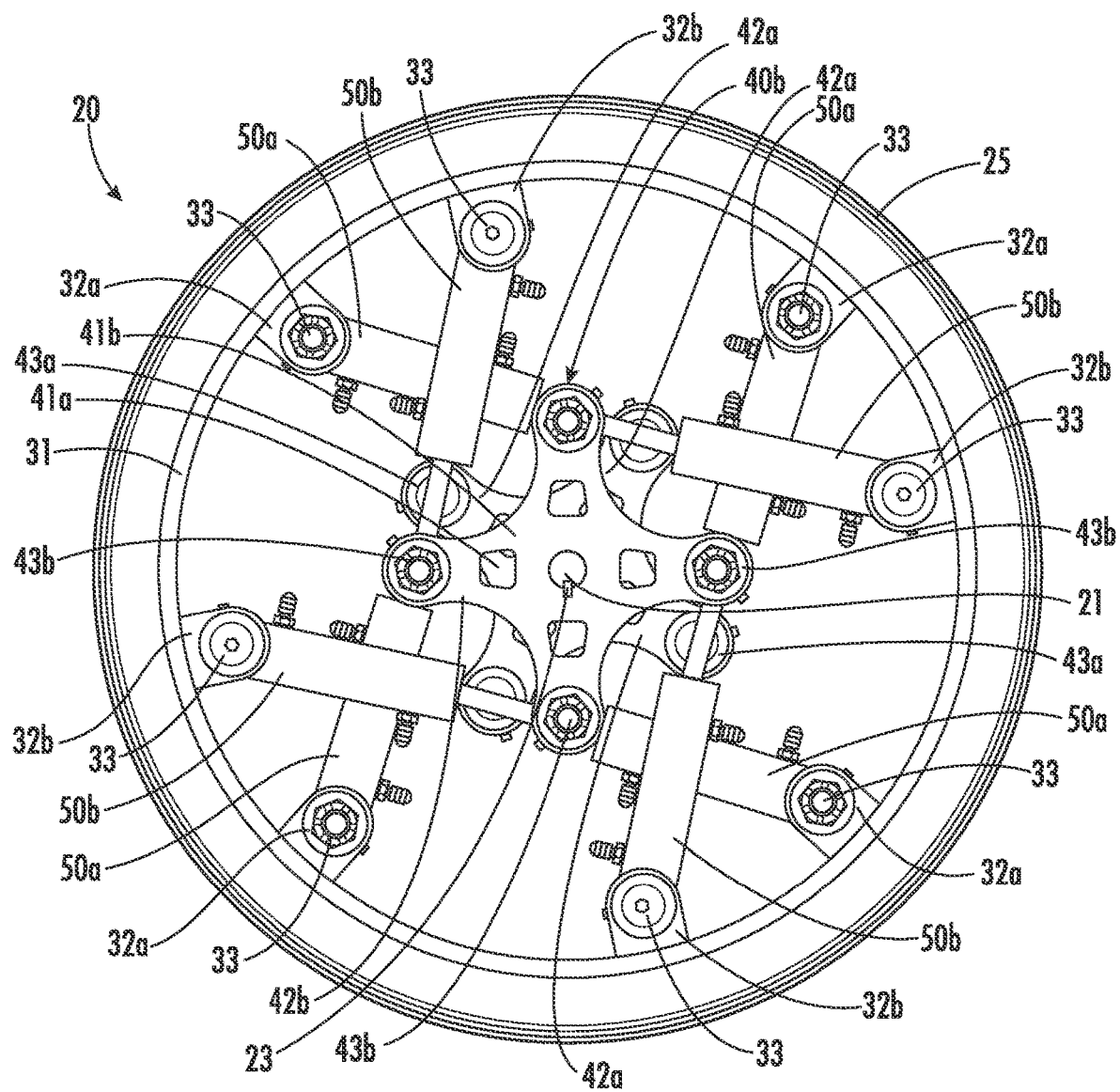
FIG. 2 is a schematic side view of the wheel assembly of FIG. 1.
Figure 3:
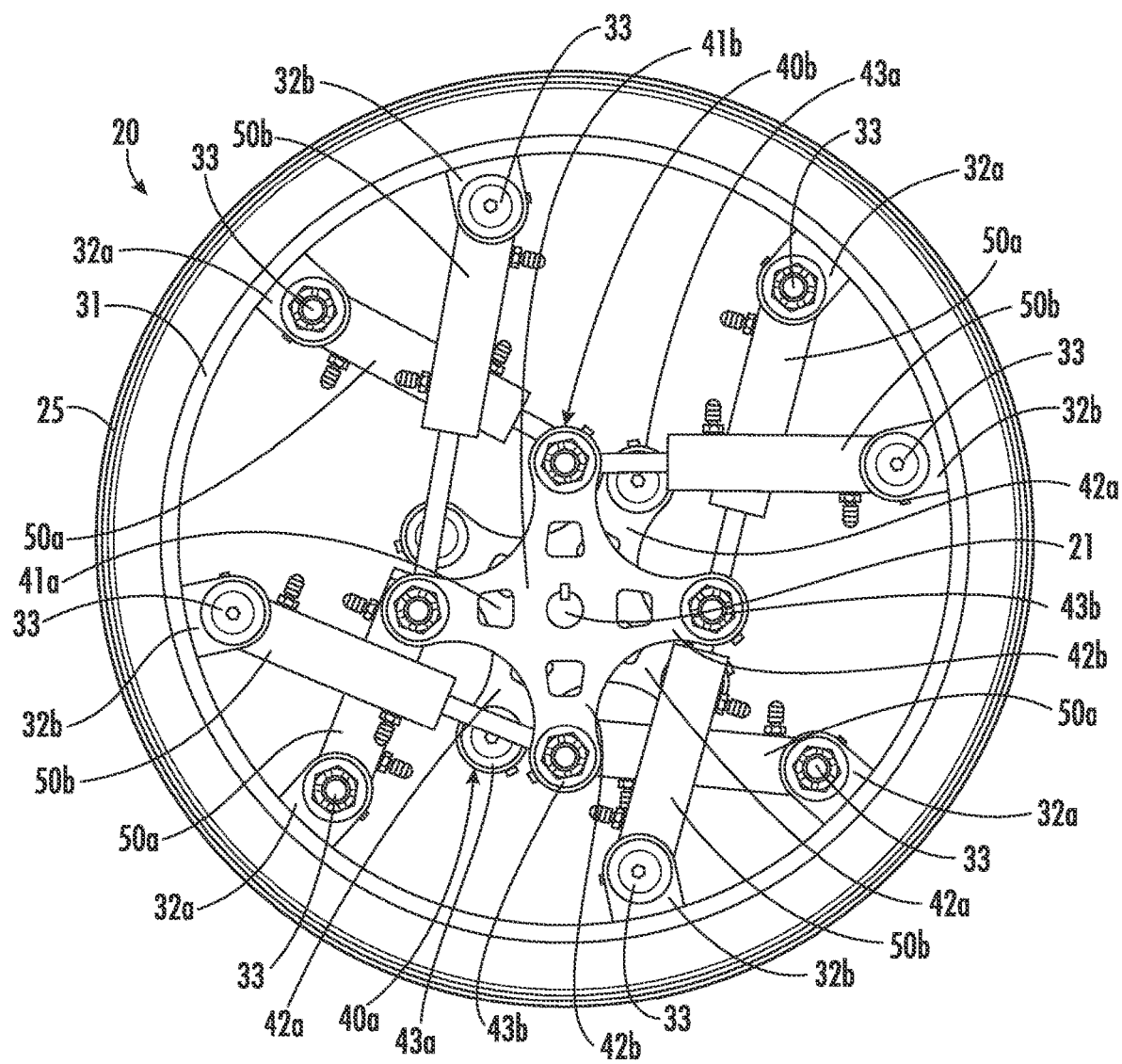
FIG. 3 is a schematic side view of the wheel assembly of FIG. 2 under displacement.
Figure 4:
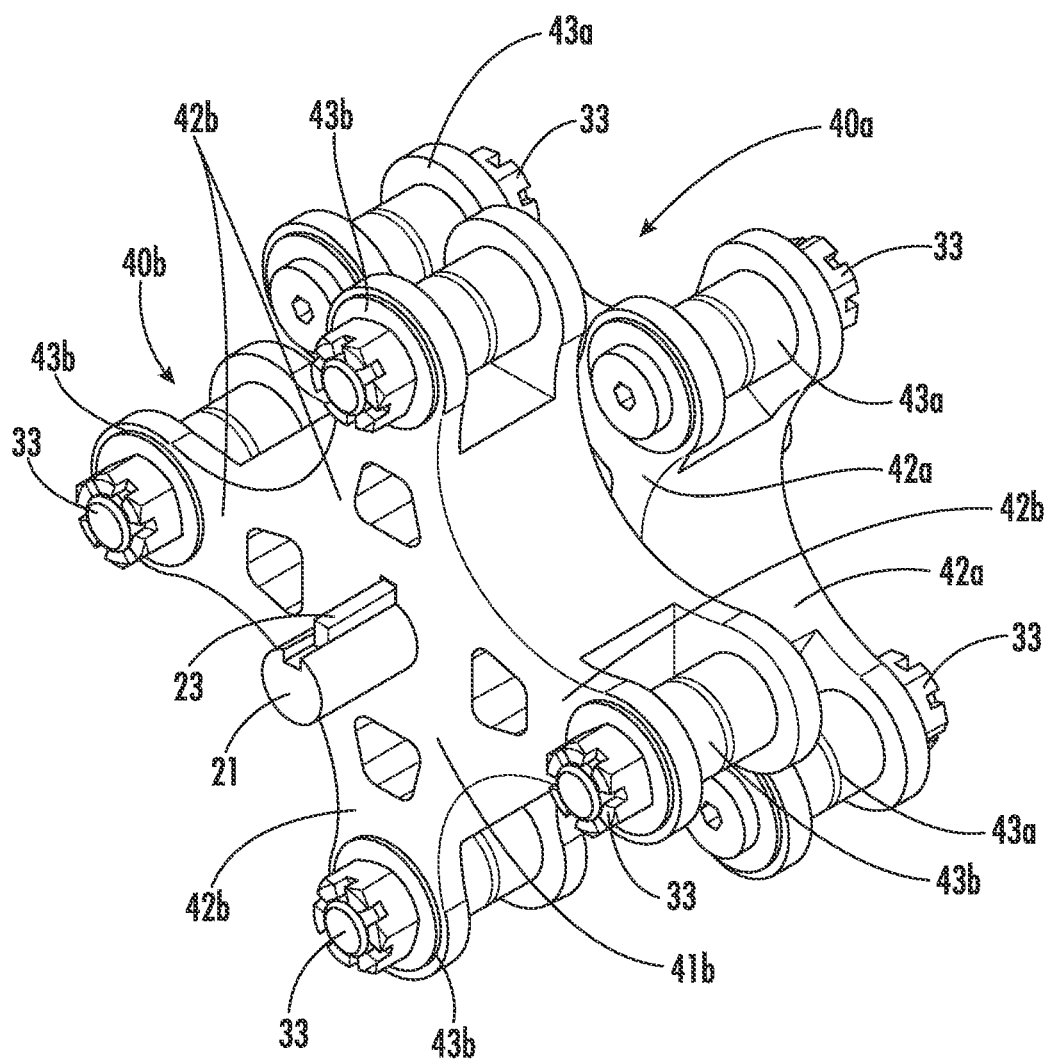
FIG. 4 is a schematic perspective view of the axle assemblies of the wheel assembly of FIG. 1.
Figure 5:
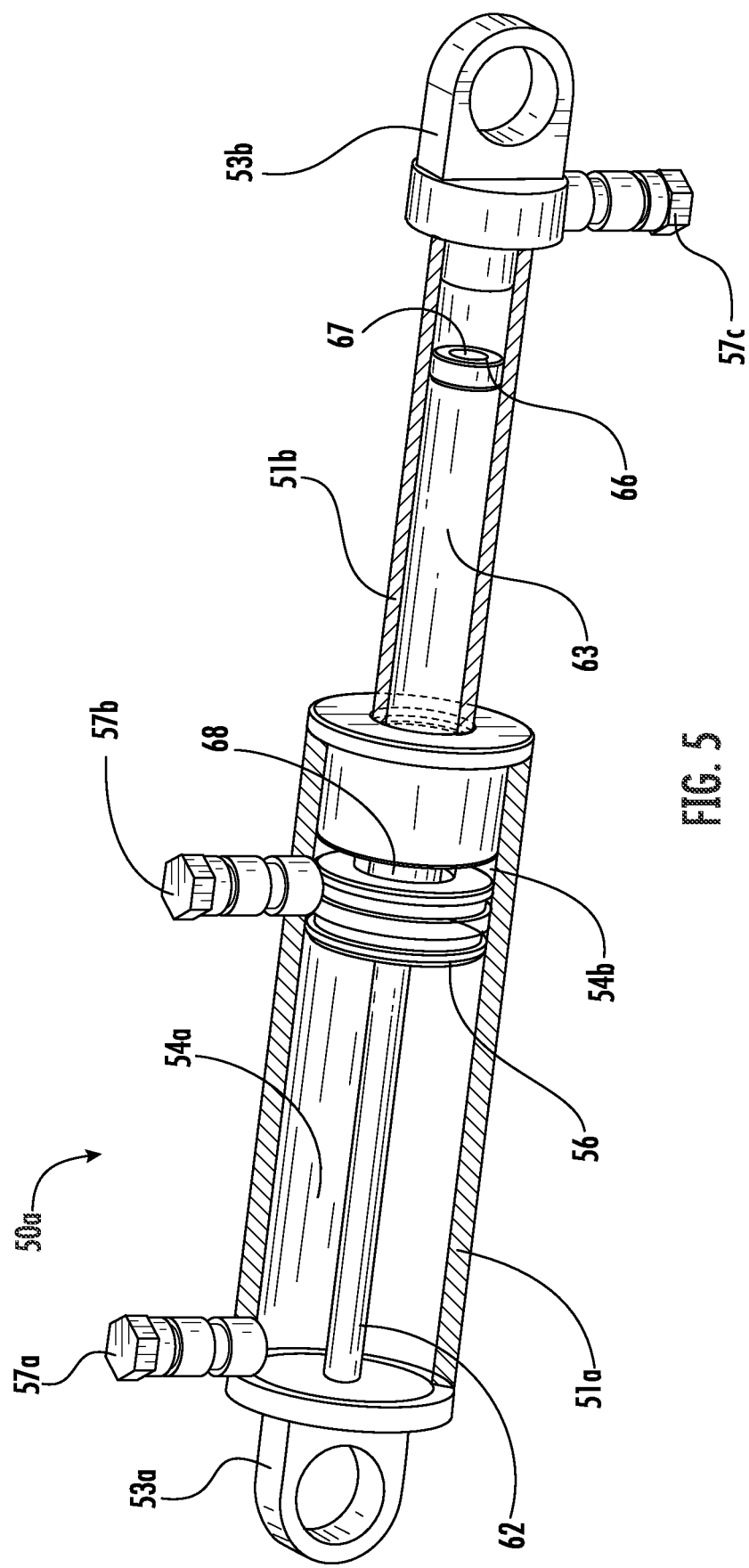
FIG. 5 is a partial cut-away view of the gas spring with associated integral hydraulic damper of the wheel assembly of FIG. 1.
Figure 6:
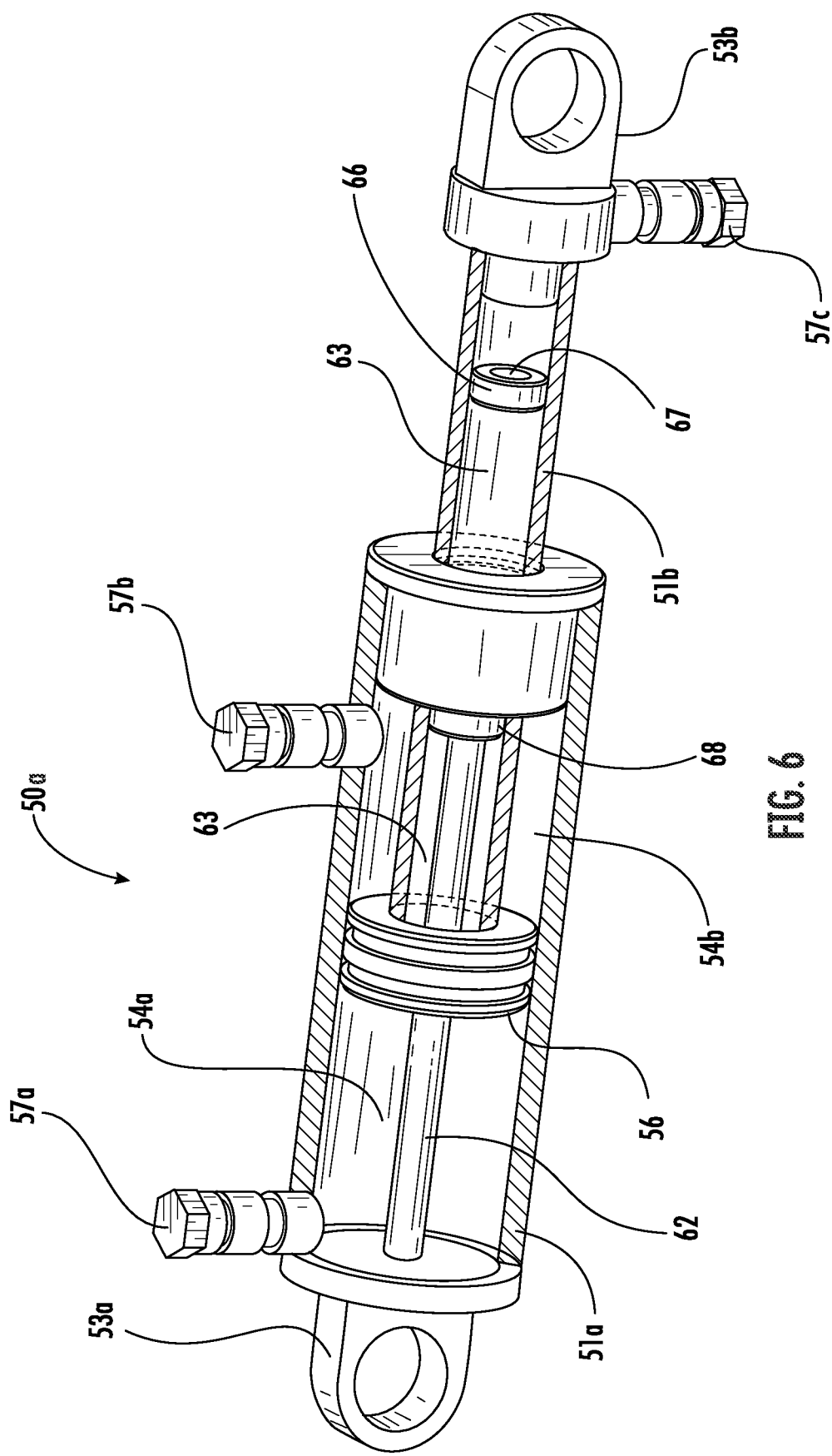
FIG. 6 is another partial cut-away view of the gas spring with associated integral hydraulic damper of the wheel assembly of FIG. 1.
Figure 7:
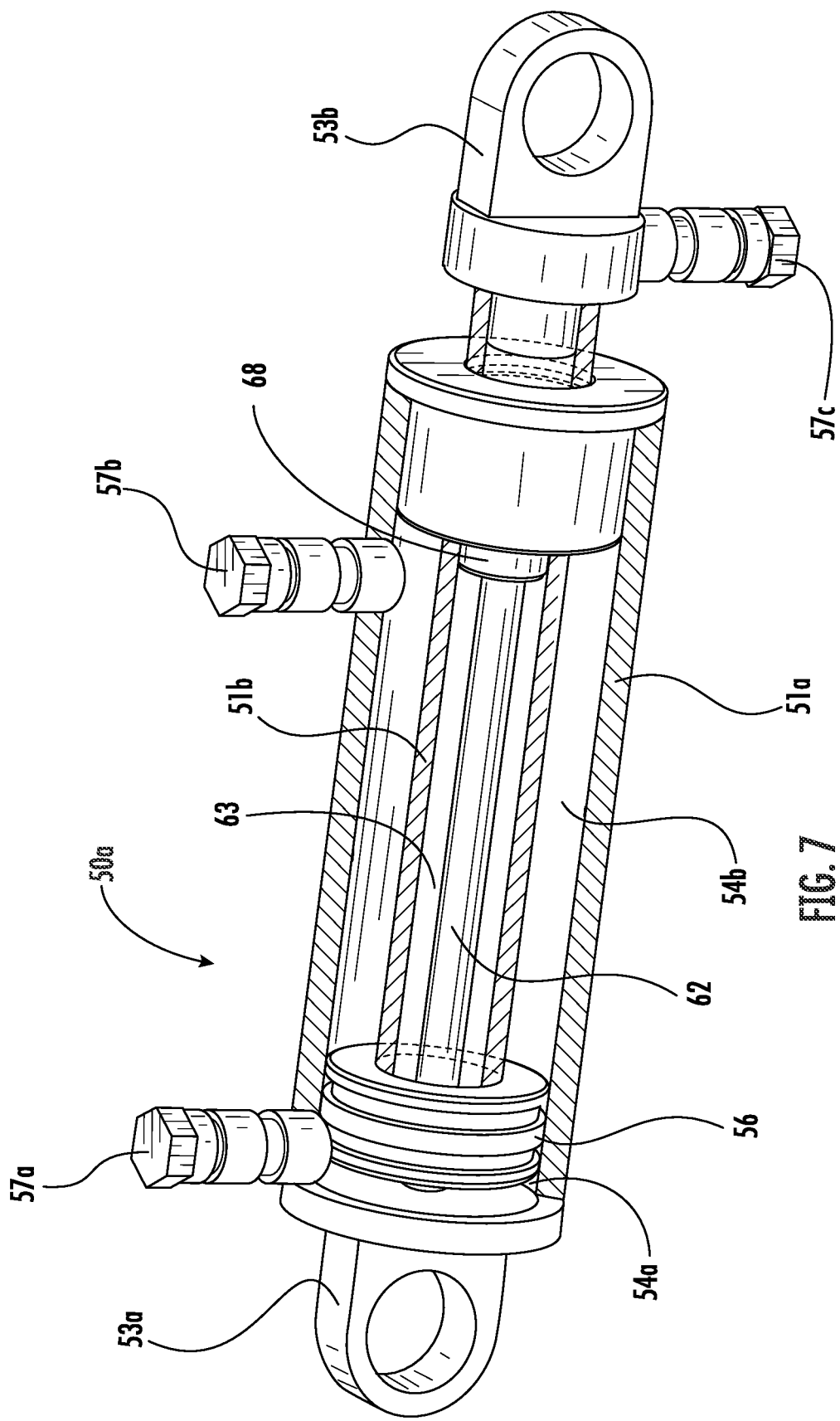
FIG. 7 is another partial cut-away view of the gas spring with associated integral hydraulic damper of the wheel assembly of FIG. 1.
Figure 8:
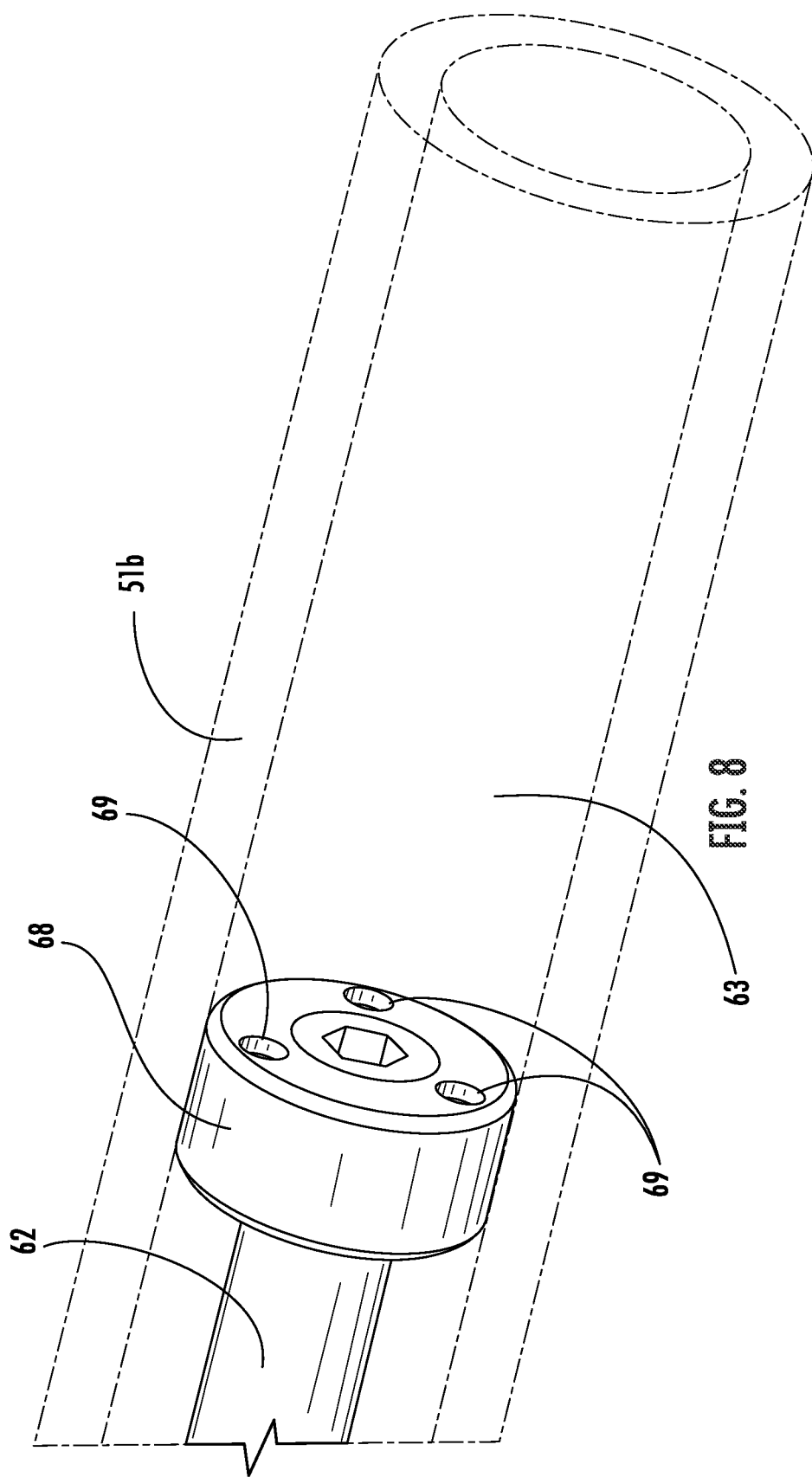
FIG. 8 is an enlarged partial cut-away view of a portion of the gas spring with associated integral hydraulic damper of the wheel assembly of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notation is used to indicate similar elements in alternative embodiments.

Referring initially to FIG. 1-4, a wheel assembly 20 may be for coupling to an axle 21, for example, of a bicycle, rickshaw, wheelchair, lawnmower, wagon, or other lightweight vehicle. The wheel assembly 20 includes an outer rim 31, for example, surrounding the axle 21. The axle 21 has a keyway therein.

A tread 25 is illustratively carried by an exterior of the outer rim 21. For example, the tread 25 may include a solid non-pneumatic tread, for example, and include rubber. Of course, the tread 25 may include another material and may have a tread pattern corresponding to a particular usage.

The wheel assembly 20 also illustratively includes distal inboard attachment points 32a coupled to the outer rim 31 and distal outboard attachment points 32b coupled to the outer rim. More particularly, the distal inboard attachment points 32a and the distal outboard attachment points 32b are carried by the outer rim 31 adjacent the inboard side of the wheel assembly 20 and the outboard side of the wheel assembly, respectively. The distal inboard and distal outboard attachment points 32a, 32b each have a U-shape to receive a respective inboard or outboard gas spring 50a, 50b. The respective gas spring 50a, 50b is secured to the corresponding distal inboard or outboard attachment point 32a, 32b via a fastener 33 (e.g., screw and nut) so that the respective inboard or outboard gas springs pivot about the fastener.

The wheel assembly 20 also includes an inboard axle attachment assembly 40a. The inboard axle attachment assembly 40a has an axle receiving opening therein to receive the axle 21 therethrough. A keyway is coupled to the axle receiving opening.

The inboard axle attachment assembly 40a illustratively includes an inboard medial portion 41a to be coupled to the axle 21. Angularly spaced inboard arms 42a, for example, equally spaced around the inboard medial portion 41a, extend outwardly from the inboard medial portion and define proximal inboard attachment points 43a for coupling to the inboard gas springs 50a. While there are illustratively four angularly spaced inboard arms 42a, there may be any number of angularly spaced inboard arms.

The wheel assembly 20 also includes an outboard axle attachment assembly 40b. The inboard axle attachment assembly 40b has an axle receiving opening therein to receive the axle 21 therethrough. A keyway is coupled to the axle receiving opening. A locking spline 23 is received within the keyways to lock the inner and outer axle attachment assemblies 40a, 40b to the axle 21 and to restrict relative rotation among the axle, the inner axle attachment assembly, and the outer axle attachment assembly.

The outboard axle attachment assembly 40b is rotationally offset from the inboard axle attachment assembly 40a. While the rotational offset of about 30-degrees is illustrated, those skilled in the art will appreciate the rotational offset may be another angle, for example, 45-degrees. The outboard axle attachment assembly 40b, similarly to the inboard axle attachment assembly 40a, includes an outboard medial portion 41b to be coupled to the axle 21, and angularly spaced outboard arms 42b, for example, equally spaced around the outboard medial portion, extending outwardly from the outboard medial portion and defining proximal outboard attachment points 43b for coupling to the outboard gas springs 50b. The rotational offset between the inboard and outboard axle attachment assemblies 40a, 40b permits inboard and outboard access to the inboard and outboard gas springs 50a, 50b at the distal inboard and distal outboard attachment points 32a, 32b and at the proximal inboard and outboard attachment points 43a, 43b.

The inboard gas springs 50a are each coupled between respective ones of the distal inboard attachment points 32a and the proximal inboard attachment points 43a. The outboard gas springs 50b are each coupled between respective ones of the distal outboard attachment points 32b and the proximal outboard attachment points 43b. The inboard and outboard gas springs 50a, 50b each have an operating stroke that defines a mechanical stop.

Each inboard and outboard gas spring 50a, 50b may be in the form of an inboard and outboard gas springs with associated integral hydraulic dampers. As will be appreciated by those skilled in the art, the gas springs with associated integral hydraulic dampers 50a, 50b provide the suspension and provide damping.

Referring now additionally to FIGS. 5-8, further details of an exemplary gas spring with associated integral hydraulic damper 50a (inboard or outboard) will now be described. The gas spring with associated integral hydraulic damper 50a includes a first cylinder body 51a and a second cylinder body 51b. The second cylinder body 51b is slidable within the first cylinder body 51a. In other words, the second cylinder body 51b may conceptually be considered a piston movable within with the first cylinder body 51a.

A first seal 56 is carried by an end of the of second cylinder body 51b. The first seal 56 defines first and second gas chambers 54a, 54b within the first cylinder body 51a. A shaft 62 is coupled to an end of the first cylinder body 51a and extends within the first cylinder body and into the second cylinder body 51b. The shaft 62 defines a hydraulic fluid chamber 63 within the second cylinder body 51b. Each gas spring with associated integral hydraulic damper 50a also includes an enlarged orifice body 68 coupled to the shaft 62 to define a hydraulic damper with the second cylinder body 51b. The enlarged orifice body 68 has orifices 69 therein to permit the flow of hydraulic fluid therethrough. While three orifices 69 are illustrated, there may be any number of orifices.

A flow restrictor 66 is carried within the second cylinder body 51b. The flow restrictor 66 illustratively includes an orifice 67 therein to permit hydraulic fluid to pass therethrough.

Gas ports 57a, 57b are respectively coupled to the first and second gas chambers 54a, 54b of each gas spring with associated integral hydraulic damper 50. A hydraulic fluid port 57c is coupled to the second cylinder body 51b. While two gas ports and one hydraulic fluid port is illustrated, those skilled in the art will appreciate that there may be more any number of gas and hydraulic fluid ports 57a-57c.

Each gas spring with associated integral hydraulic damper 50a also includes first and second mounting brackets 53a, 53b coupled to the first and second cylinder bodies 51a, 51b, respectively. The first and second mounting brackets 53a, 53b, similar to the mounting brackets described above, are for mounting the gas springs with associated integral hydraulic dampers 50a between the distal and proximal attachment points 32a, 43a.

Those skilled in the art will appreciate that the gas springs with associated integral hydraulic dampers 50a, 50b may advantageously provide a gas suspension and a damper function while saving space within the wheel assembly. More particularly, the gas springs with associated integral hydraulic dampers 50a, 50b provide this functionality by way of a Kelvin coupling mechanism, as will be appreciated by those skilled in the art.

Figure 9:
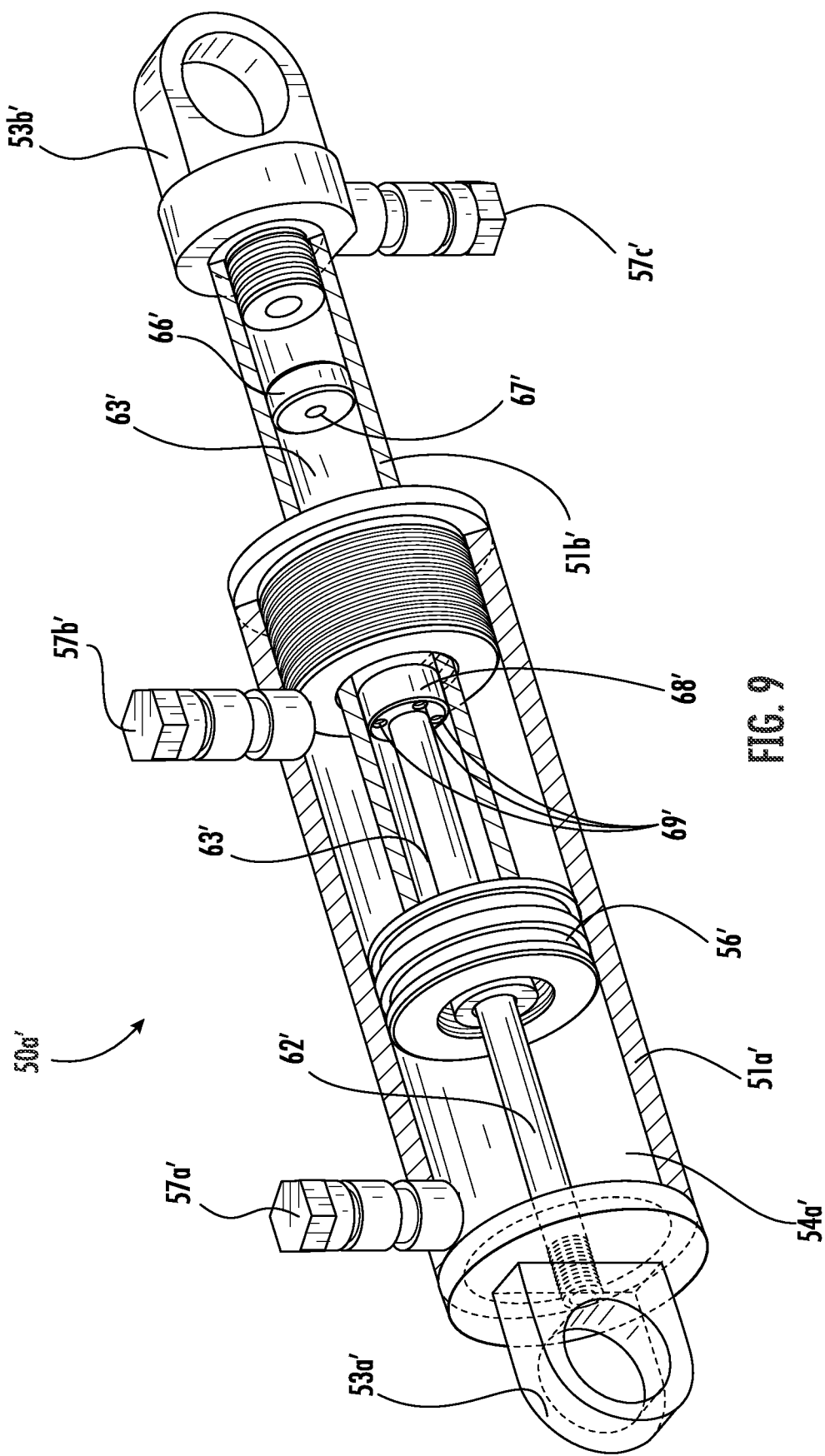
FIG. 9 is a partial cut-away view of a gas spring with associated integral hydraulic damper in accordance with another embodiment.
Figure 10:
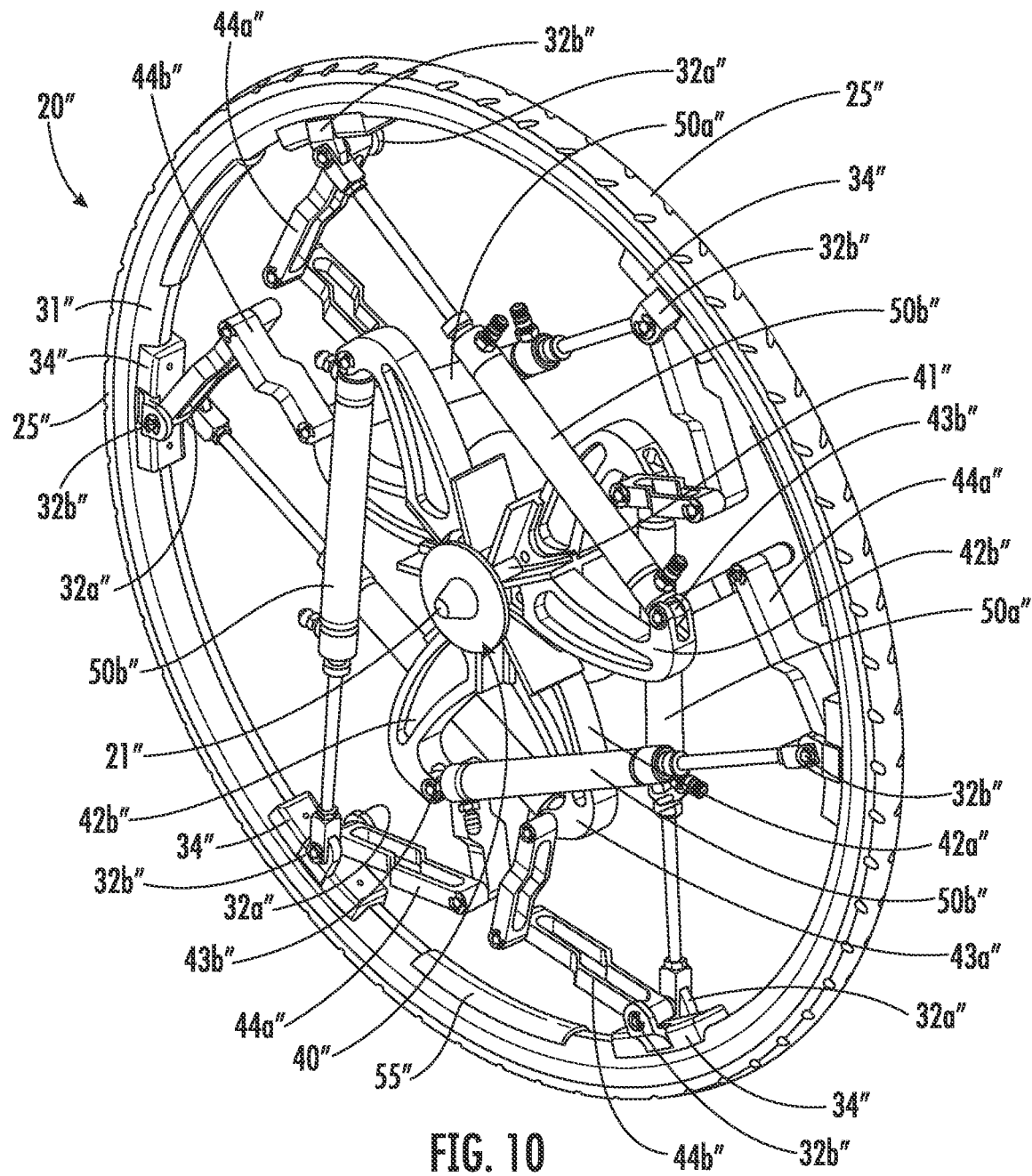
FIG. 10 is a schematic perspective view of a wheel assembly according to another embodiment.
Figure 11:
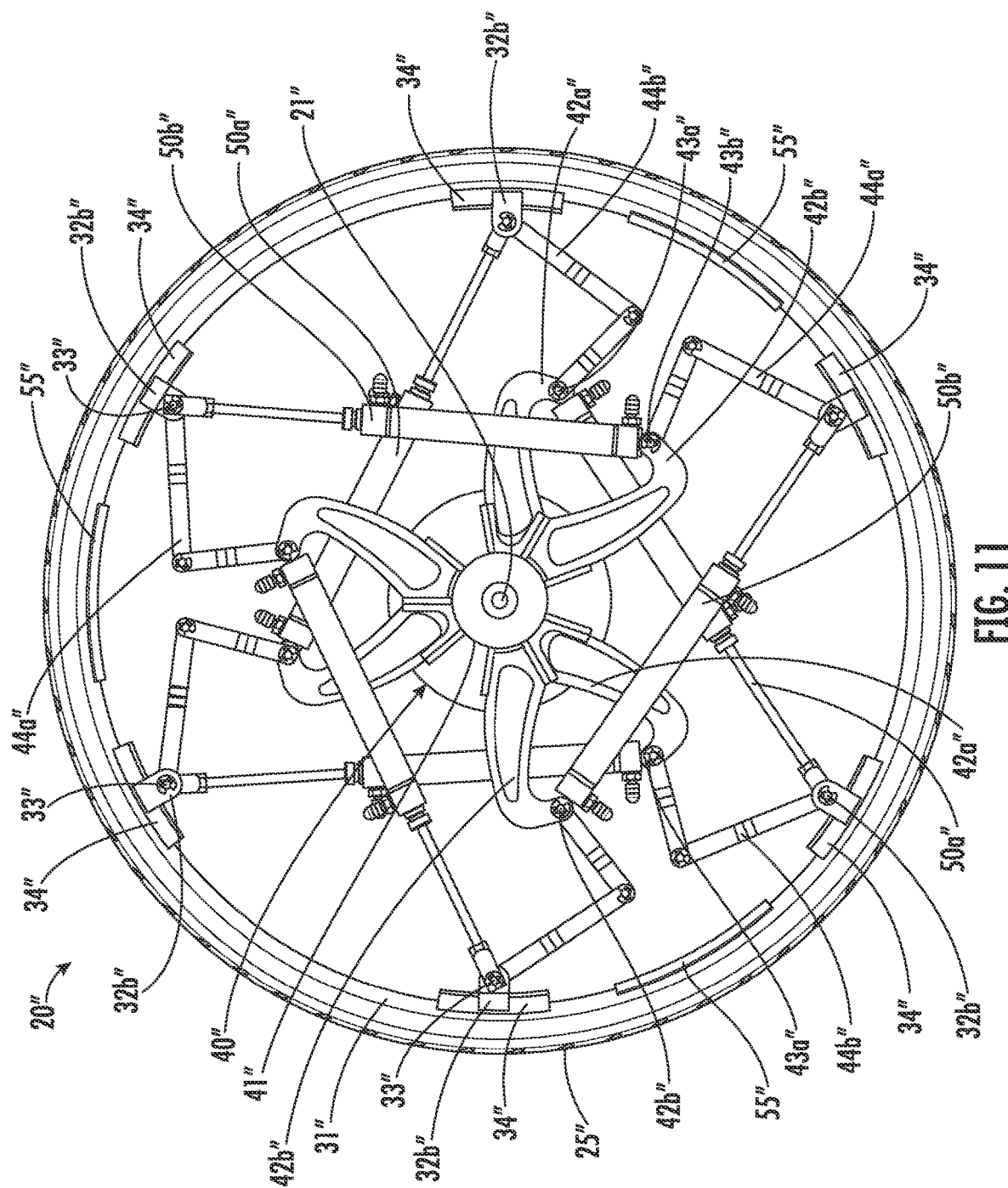
FIG. 11 is a schematic side view of the wheel assembly of FIG. 10.
Figure 12:
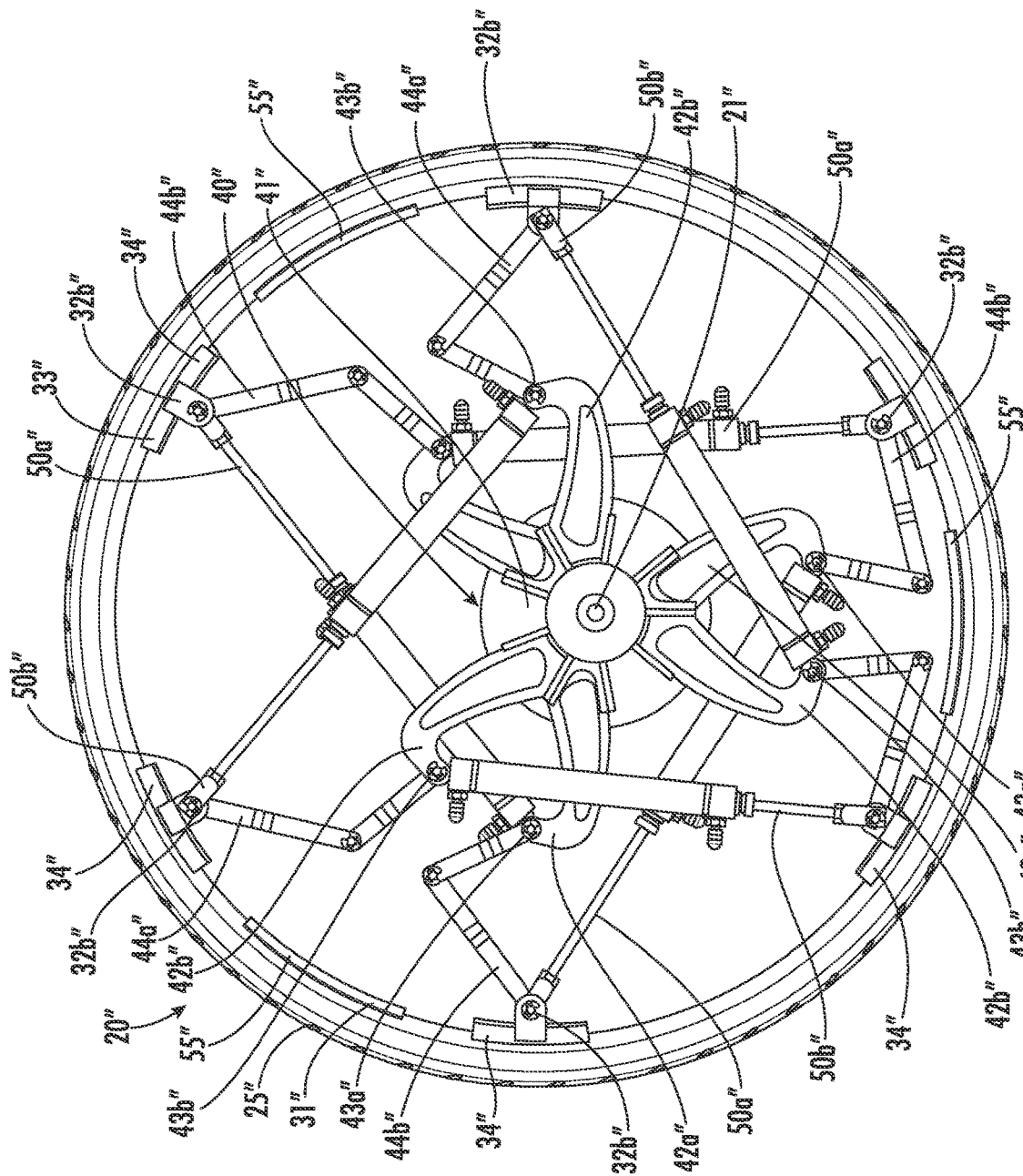
FIG. 12 is a schematic side view of the wheel assembly of FIG. 11 under displacement.
Figure 13:
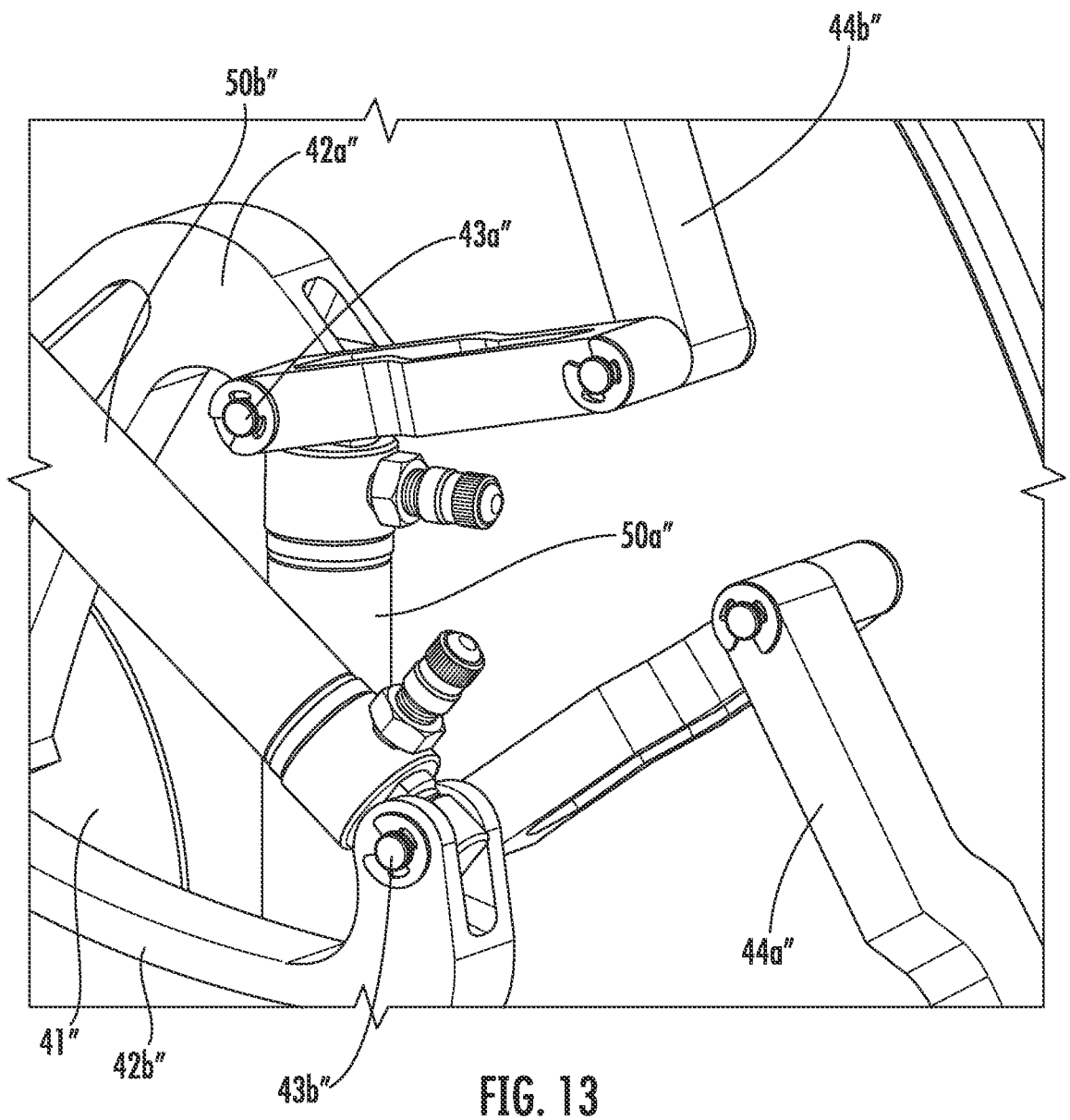
FIG. 13 is a schematic perspective view of the axle assembly of the wheel assembly of FIG. 10.

Referring briefly to FIG. 9, in another embodiment, the shaft 62', the first seal 56', an end of the first cylinder body 51a', and the end of the second cylinder body 51b' opposite the first seal may be threaded. By provided threads on the shaft 62', the first seal 56', and the ends of the first and second cylinder bodies 51a', 51b', the gas springs with associated integral hydraulic dampers 50' may be adjusted for a desired response with respect to the spring and damper. A volume compensator (e.g., in the form of a reservoir and diaphragm, not illustrated) may be spring loaded, in which case, a charge post may not be desirable. Other elements illustrated but specifically described, for example, the first cylinder body 51a', the enlarged orifice body 68' and associated orifices 69', the first and second gas chambers 54a', 54b', the second cylinder wall 66' and associated orifice 67', the hydraulic fluid chamber 63', the ports 57a'-57c', and the first and second mounting brackets 53a', 53b' are similar to those described above. Further details of wheel assemblies including gas springs with integral dampers are describe in U.S. Patent Application Publication No. US-2020-0369079-A1, the entire contents of which are hereby incorporated by reference.

A method aspect is directed to a method of making wheel assembly 20 for coupling to an axle 21. The method includes coupling a plurality of distal inboard attachment points 32a to an outer rim 31 and a plurality of distal outboard attachment points 32b coupled to the outer rim, and coupling an inboard axle attachment assembly 40a to the axle, the inboard axle attachment assembly including an inboard medial portion 41a to be coupled to the axle and a plurality of angularly spaced inboard arms 42a extending outwardly from the inboard medial portion and defining proximal inboard attachment points 43a. The method also includes coupling an outboard axle attachment assembly 40b to the axle 21, the outboard axle attachment assembly being rotationally offset from the inboard axle attachment assembly 40a and including an outboard medial portion 41b to be coupled to the axle and a plurality of angularly spaced outboard arms 42b extending outwardly from the outboard medial portion and defining proximal outboard attachment points 43b. The method also includes coupling each of a plurality of inboard gas springs 50a, between respective ones of the distal inboard attachment points 32a and the proximal inboard attachment points 43a, and coupling each of a plurality of outboard gas springs 50b, between respective ones of the distal outboard attachment points 32b and the proximal outboard attachment points 43b.

Referring now to FIGS. 10-13, in another embodiment, a wheel assembly 20″ for coupling to an axle 21″, for example, of a bicycle, rickshaw, wheelchair, lawnmower, wagon, or other lightweight vehicle. The wheel assembly 20″ includes an outer rim 31″, for example, surrounding the axle 21″.

A tread 25″ is illustratively carried by an exterior of the outer rim 31″. For example, the tread 25″ may include a solid non-pneumatic tread, for example, and include rubber. Of course, the tread 25″ may include another material and may have a tread pattern corresponding to a particular usage.

The wheel assembly 20″ also illustratively includes distal inboard attachment points 32a″ coupled to the outer rim 31″ and distal outboard attachment points 32b″ coupled to the outer rim. More particularly, the distal inboard attachment points 32a″ and the distal outboard attachment points 32b″ are carried by the outer rim 31″. The distal inboard and distal outboard attachment points 32a″, 32b″ each couple to a common attachment bracket 34″ having a shape conforming to the shape of the interior of the outer rim 31″ and couple a respective inboard or outboard spring 50a″, 50b″ and respective inboard or outboard lateral stop 44a″, 44b″ thereto. The respective gas spring 50a″, 50b″ and respective inboard or outboard lateral stop 44a″, 44b″ are secured to the corresponding distal inboard or outboard attachment point 32a″, 32b″ via a fastener 33″ so that the respective inboard or outboard gas spring 50a″, 50b″ and inboard and outboard attachment point pivot about the fastener. In other words, for any given outboard distal attachment point 32b″, whereto a corresponding outboard gas spring 50b″ is coupled, an inboard lateral stop 44a″ is also coupled. A single fastener 33″ secures both an outboard gas spring 50b″ and an inboard lateral stop 44a″ to the outboard attachment point 32b″ at the corresponding attachment bracket 34″.

The wheel assembly 20″ also illustratively includes an axle attachment assembly 40″. The axle attachment assembly 40″ includes a medial portion 41' to be coupled to the axle 21″, and a rotationally spaced inboard arcuate arms 42a″ extending outwardly from the medial portion and defining a plurality of proximal inboard attachment points 43a″.

The wheel assembly 20″ also illustratively includes a rotationally spaced outboard arcuate arms 42b″ extending outwardly from the medial portion 41″ and defining a plurality of proximal outboard attachment points 43b″. Together with the inboard arcuate arms 42a″, the outboard arcuate arms 42b″ generally have a C-shape. Moreover, while there are illustratively three inboard and three outboard arcuate arms 42a″, 42b″, those skilled in the art will appreciate that there may be any number of inboard and outboard arcuate arms.

The inboard gas springs 50a″ are each coupled between respective ones of the distal inboard attachment points 32a″ and the proximal inboard attachment points 43a″. The outboard gas springs 50b″ are each coupled between respective ones of the distal outboard attachment points 32b″ and the proximal outboard attachment points 43b″. The inboard and outboard gas springs 50a″, 50b″ each have an operating stroke that defines a mechanical stop.

Each inboard and outboard gas spring 50a″, 50b″ may be in the form of inboard and outboard gas springs with associated integral hydraulic dampers, for example, as described above with respect to FIGS. 5-9. As will be appreciated by those skilled in the art, the gas springs with associated integral hydraulic dampers 50a″, 50b″ provide the suspension and provide damping. Further details of wheel assemblies including gas springs with integral dampers are describe in U.S. Patent Application Publication No. US-2020-0369079-A1, the entire contents of which are hereby incorporated by reference.

The inboard lateral stops 44a″ are each coupled between a respective distal inboard attachment point 32a″ and a respective proximal inboard attachment point 43a″. Each inboard lateral stop 44a″ is illustratively in the form of a hinge retainer, for example, defining inboard hinge retainers. Each inboard lateral stop 44a″ is coupled to a same respective distal inboard attachment point 32a″ as an inboard spring 50a″, via the attachment bracket 34″ and fastener 33″, that is coupled to an adjacent rotationally spaced inboard arcuate arm 42a″. As will be appreciated by those skilled in the art, the inboard lateral stops 44a″ may provide increased lateral stability or may reduce or absorb increased lateral forces or side-loading. There may be any number of inboard lateral stops 44a″.

Outboard lateral stops 44b″ are each coupled between a respective distal outboard attachment point 32b″ and a respective proximal outboard attachment point 43b″. Each outboard lateral stop 44b″ is illustratively in the form of a hinge retainer, for example, defining outboard hinge retainers. Each outboard lateral stop 44b″ is coupled to a same respective distal outboard attachment point 32b″, via the attachment bracket 34″ and fastener 33″, as an outboard spring 50b″ that is coupled to an adjacent rotationally spaced outboard arcuate arm 42b″. As will be appreciated by those skilled in the art, the outboard lateral stops 44b″ may provide increased lateral stability or may reduce or absorb increased lateral forces or side-loading. There may be any number of outboard lateral stops 44b″. An elastomeric body or other spacer may be between a gas spring 50a″, 50b″, and an inboard or outboard lateral stop 44a″, 44b″ to reduce friction therebetween and to further permit relative movement between the gas springs and lateral stops.

An elastomeric body 55″ is carried by an interior of the outer rim 31″. The elastomeric body 55″ may define a mechanical stop or displacement limiter, for example, for the inboard and outboard lateral stops 44a″, 44b″. Other and/or additional mechanical stops may be used, for example, to limit displacement.

A method aspect is directed to a method of making a wheel assembly 20″ for coupling to an axle 21″. The method includes coupling a plurality of distal inboard attachment points 32a″ coupled to an outer rim 31″, and coupling a plurality of distal outboard attachment points 32b″ to the outer rim. The method also includes coupling each of a plurality of inboard gas springs 50a″ between respective ones of the plurality of distal inboard attachment points 32a″ and respective one of a plurality of proximal inboard attachment points 43a″ defined by of a plurality of rotationally spaced inboard arcuate arms 42a″ of an axle attachment assembly 40″ extending outwardly from a medial portion 41″ of the axle attachment assembly. The method further includes coupling each of a plurality of outboard gas springs 50b″ between respective ones of the plurality of distal outboard attachment points 32b″ and respective one of a plurality of proximal inboard attachment points 43a'' defined by of a plurality of rotationally spaced outboard arcuate arms 42b'' of an axle attachment assembly 40'' extending outwardly from a medial portion 41'' of the axle attachment assembly.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wheel assembly for coupling to an axle comprising:
   an outer rim;
   a plurality of distal inboard attachment points coupled to the outer rim and a plurality of distal outboard attachment points coupled to the outer rim and rotationally offset from the plurality of distal inboard attachment points;
   an inboard axle attachment assembly comprising an inboard medial portion to be coupled to the axle and a plurality of angularly spaced inboard arms extending outwardly from the inboard medial portion and defining proximal inboard attachment points;
   an outboard axle attachment assembly rotationally offset from the inboard axle attachment assembly and comprising an outboard medial portion to be coupled to the axle and a plurality of angularly spaced outboard arms extending outwardly from the outboard medial portion and defining proximal outboard attachment points;
   a plurality of inboard gas springs, each coupled between respective ones of the distal inboard attachment points and the proximal inboard attachment points; and
   a plurality of outboard gas springs, each coupled between respective ones of the distal outboard attachment points and the proximal outboard attachment points;
   the plurality of inboard gas springs and the plurality of outboard gas springs being coupled so that each inboard gas spring radially crosses a respective outboard gas spring;
   each of the plurality of inboard and outboard gas springs comprising
      a first cylinder body and a second cylinder body slidable therein,
      a first seal carried by an end of the second cylinder body defining first and second gas chambers within the first cylinder body,
      a shaft extending within the first cylinder body and into the second cylinder body defining a hydraulic fluid chamber within the second cylinder body, and
      an enlarged orifice body coupled to the shaft defining a hydraulic damper with the second cylinder body.

2. The wheel assembly of claim 1 wherein the rotational offset between the inboard and outboard axle attachment assemblies permits inboard and outboard access to the plurality of inboard and outboard gas springs at the plurality of the distal inboard and distal outboard attachment points.

3. The wheel assembly of claim 1 wherein the axle has an axle keyway therein; and wherein the inboard and outboard axle attachment assemblies each have an axle receiving opening and a keyway coupled thereto to receive a locking spline within the keyways and the axle keyway.

4. The wheel assembly of claim 1 wherein the plurality of angularly spaced outboard arms are equally spaced around the outboard medial portion; and wherein the plurality of angularly spaced inboard arms are equally spaced around the inboard medial portion.

5. The wheel assembly of claim 1 wherein each of the plurality of inboard and outboard gas springs has an operating stroke defining a mechanical stop.

6. The wheel assembly of claim 1 further comprising a tread carried by an exterior of the outer rim.

7. The wheel assembly of claim 6 wherein the tread comprises a solid non-pneumatic tread.

8. A wheel assembly for coupling to an axle comprising:
   an outer rim;
   a plurality of distal inboard attachment points coupled to the outer rim and a plurality of distal outboard attachment points coupled to the outer rim and rotationally offset from the plurality of distal inboard attachment points;
   an inboard axle attachment assembly comprising an inboard medial portion to be coupled to the axle and a plurality of angularly spaced inboard arms extending outwardly from the inboard medial portion and defining proximal inboard attachment points;
   an outboard axle attachment assembly rotationally offset from the inboard axle attachment assembly and comprising an outboard medial portion to be coupled to the axle and a plurality of angularly spaced outboard arms extending outwardly from the outboard medial portion and defining proximal outboard attachment points;
   a plurality of inboard gas springs with associated integral hydraulic dampers, each coupled between respective ones of the distal inboard attachment points and the proximal inboard attachment points; and
   a plurality of outboard gas springs with associated integral hydraulic dampers, each coupled between respective ones of the distal outboard attachment points and the proximal outboard attachment points;
   the plurality of inboard gas springs and the plurality of outboard gas springs being coupled so that each inboard gas spring radially crosses a respective outboard gas spring;
   each of the plurality of inboard and outboard gas springs with associated integral hydraulic dampers comprising
      a first cylinder body and a second cylinder body slidable therein,
      a first seal carried by an end of the second cylinder body defining first and second gas chambers within the first cylinder body,
      a shaft extending within the first cylinder body and into the second cylinder body defining a hydraulic fluid chamber within the second cylinder body, and
      an enlarged orifice body coupled to the shaft defining a hydraulic damper with the second cylinder body.

9. The wheel assembly of claim 8 wherein the rotational offset between the inboard and outboard axle attachment assemblies permits inboard and outboard access to the plurality of inboard and outboard gas springs at the plurality of the distal inboard and distal outboard attachment points.

10. The wheel assembly of claim 8 wherein the axle has an axle keyway therein; and
   wherein the inboard and outboard axle attachment assemblies each have an axle receiving opening and a keyway coupled thereto to receive a locking spline within the keyways and the axle keyway.

11. The wheel assembly of claim 8 wherein the plurality of angularly spaced outboard arms are equally spaced around the outboard medial portion; and wherein the plurality of angularly spaced inboard arms are equally spaced around the inboard medial portion.

12. A method of making a wheel assembly for coupling to an axle comprising:
coupling a plurality of distal inboard attachment points to an outer rim and a plurality of distal outboard attachment points coupled to the outer rim and rotationally offset from the plurality of distal attachment points;
coupling an inboard axle attachment assembly to the axle, the inboard axle attachment assembly comprising an inboard medial portion to be coupled to the axle and a plurality of angularly spaced inboard arms extending outwardly from the inboard medial portion and defining proximal inboard attachment points;
coupling an outboard axle attachment assembly to the axle, the outboard axle attachment assembly being rotationally offset from the inboard axle attachment assembly and comprising an outboard medial portion to be coupled to the axle and a plurality of angularly spaced outboard arms extending outwardly from the outboard medial portion and defining proximal outboard attachment points;
coupling each of a plurality of inboard gas springs, between respective ones of the distal inboard attachment points and the proximal inboard attachment points; and
coupling each of a plurality of outboard gas springs, between respective ones of the distal outboard attachment points and the proximal outboard attachment points;
the plurality of inboard gas springs and the plurality of outboard gas springs being coupled so that each inboard gas spring radially crosses a respective outboard gas spring;
each of the plurality of inboard and outboard gas springs comprising
a first cylinder body and a second cylinder body slidable therein,
a first seal carried by an end of the second cylinder body defining first and second gas chambers within the first cylinder body,
a shaft extending within the first cylinder body and into the second cylinder body defining a hydraulic fluid chamber within the second cylinder body, and
an enlarged orifice body coupled to the shaft defining a hydraulic damper with the second cylinder body.

13. The method of claim 12 wherein the rotational offset between the inboard and outboard axle attachment assemblies permits inboard and outboard access to the plurality of inboard and outboard gas springs at the plurality of the distal inboard and distal outboard attachment points.

14. The method of claim 12 wherein the axle has an axle keyway therein; and wherein the inboard and outboard axle attachment assemblies each have an axle receiving opening and a keyway coupled thereto to receive a locking spline within the keyways and the axle keyway.

15. The method of claim 12 wherein the plurality of angularly spaced outboard arms are equally spaced around the outboard medial portion; and wherein the plurality of angularly spaced inboard arms are equally spaced around the inboard medial portion.

16. The method of claim 12 further comprising coupling a tread to an exterior of the outer rim.

\* \* \* \* \*